United States Patent
Xie et al.

(10) Patent No.: US 12,358,320 B2
(45) Date of Patent: Jul. 15, 2025

(54) CERAMIC PLATE WITH COLORFUL FLOWING CLOUD SURFACE DECORATION EFFECT AND PREPARATION METHOD THEREOF

(71) Applicant: MONALISA GROUP CO., LTD, Foshan (CN)

(72) Inventors: Zhijun Xie, Foshan (CN); Weike Pang, Foshan (CN); Cheng Ouyang, Foshan (CN); Lingyan Huang, Foshan (CN); Weirong Xiao, Foshan (CN); Zide Wu, Foshan (CN); Haipeng Lu, Foshan (CN)

(73) Assignee: MONALISA GROUP CO., LTD, Guangdong (CN)

( * ) Notice: Subject to any disclaimer, the term of this patent is extended or adjusted under 35 U.S.C. 154(b) by 174 days.

(21) Appl. No.: 18/553,763

(22) PCT Filed: Dec. 3, 2021

(86) PCT No.: PCT/CN2021/135283
§ 371 (c)(1),
(2) Date: Oct. 3, 2023

(87) PCT Pub. No.: WO2022/213633
PCT Pub. Date: Oct. 13, 2022

(65) Prior Publication Data
US 2024/0190165 A1 Jun. 13, 2024

(30) Foreign Application Priority Data
Apr. 9, 2021 (CN) .......................... 202110381419.6

(51) Int. Cl.
*B44C 1/24* (2006.01)
*B32B 9/00* (2006.01)
(Continued)

(52) U.S. Cl.
CPC ................ *B44C 1/24* (2013.01); *B32B 9/005* (2013.01); *C03C 8/04* (2013.01); *C03C 8/14* (2013.01);
(Continued)

(58) Field of Classification Search
CPC ......... C03C 8/04; C03C 8/14; C03C 2209/00; C03C 3/062; C03C 3/087; C03C 2209/02;
(Continued)

(56) References Cited

FOREIGN PATENT DOCUMENTS

| CN | 102515876 A | 6/2012 | |
|----|----|----|----|
| CN | 109455933 A | * 3/2019 | ............... C03C 8/00 |

(Continued)

*Primary Examiner* — Abbas Rashid
*Assistant Examiner* — Caroline Beha
(74) *Attorney, Agent, or Firm* — Alleman Hall & Tuttle LLP

(57) ABSTRACT

A preparation method includes: pressing and forming a ceramic base material to obtain a green body of a ceramic plate; applying a ground glaze on the surface of the green body to cover the base color and defects of the green body; applying a cover glaze on the surface of the green body after applying the ground glaze, wherein the cover glaze contains 0.2 wt % to 0.7 wt % of coloring metal oxide to make the coloring bright; roller-printing patterns on the surface of the green body after applying the cover glaze to produce a flowing cloud effect; and drying the green body with the roller-printed patterns and firing in a kiln. The present invention uses roller printing to print the patterns of cloud effect on the surface of the cover glaze, which form a sharp contrast with the color of the cover glaze, producing a better visually distinct effect.

4 Claims, 1 Drawing Sheet

(51) Int. Cl.
- *C03C 8/04* (2006.01)
- *C03C 8/14* (2006.01)
- *C04B 41/00* (2006.01)
- *C04B 41/45* (2006.01)
- *C04B 41/50* (2006.01)
- *C04B 41/51* (2006.01)
- *C04B 41/52* (2006.01)
- *C04B 41/90* (2006.01)

(52) U.S. Cl.
CPC ........ *C04B 41/0072* (2013.01); *C04B 41/009* (2013.01); *C04B 41/4511* (2013.01); *C04B 41/4543* (2013.01); *C04B 41/4572* (2013.01); *C04B 41/4578* (2013.01); *C04B 41/5022* (2013.01); *C04B 41/51* (2013.01); *C04B 41/522* (2013.01); *C04B 41/524* (2013.01); *C04B 41/90* (2013.01); *C03C 2209/00* (2013.01)

(58) Field of Classification Search
CPC .. C03C 8/20; B44C 1/24; B32B 9/005; C04B 41/0072; C04B 41/009; C04B 41/4511; C04B 41/4543; C04B 41/4572; C04B 441/4578; C04B 41/5022; C04B 41/51; C04B 41/522; C04B 41/524; C04B 41/90; C04B 33/34; C04B 35/6266; C04B 41/52; C04B 41/89

See application file for complete search history.

(56) References Cited

FOREIGN PATENT DOCUMENTS

| | | | | |
|---|---|---|---|---|
| CN | 109455934 A | | 3/2019 | |
| CN | 109761649 A | * | 5/2019 | |
| CN | 107311699 B | * | 9/2020 | ........... B28B 11/001 |
| JP | S57118081 A | | 7/1982 | |

* cited by examiner

CERAMIC PLATE WITH COLORFUL FLOWING CLOUD SURFACE DECORATION EFFECT AND PREPARATION METHOD THEREOF

TECHNICAL FIELD

The present invention belongs to the field of building ceramics, and particularly relates to a ceramic plate with a colorful flowing cloud surface decoration effect and a preparation method thereof.

BACKGROUND

In recent years, with the increasingly mature production technology of ceramic plates, the application market of ceramic plates has become increasingly widespread and favored by customers.

Technical Problem

However, due to limitations of existing production technology, the surface decoration effect of ceramic plates is limited. At present, most ceramic products in the market adopt inkjet technology for surface decoration, and ceramic products mainly consist of polished ceramic products and dry granular ceramic products with a natural surface. Overall, the decoration effect of ceramic products is relatively simple.

Technical Solution

In view of the aforementioned defects, the present invention proposes a ceramic plate with a colorful flowing cloud surface decoration effect and a preparation method thereof. The preparation method of the present invention does not adopt inkjet printing, and is different from traditional iridescent effects (the phenomenon of color light generated by refraction or reflection of light directly into the medium). The present invention adopts a brightly colored cover glaze and roller-prints a white cloud effect pattern on the cover glaze, thus forming a flowing cloud effect on the surface of the cover glaze. In addition, the present invention also utilizes a metallic liquid luster (coloring liquid luster) to attach coloring metals to the surface of the ceramic plate to form an iridescent effect under light irradiation. The flowing cloud effect is combined with the iridescent effect of the coloring liquid luster to create a colorful flowing cloud effect through direct light irradiation.

In a first aspect, the present invention provides a preparation method for a ceramic plate with a colorful flowing cloud surface decoration effect, comprising:
pressing and forming a ceramic base material to obtain a green body of the ceramic plate;
applying a ground glaze on a surface of the green body to cover the base color and defects of the green body;
applying a cover glaze on the surface of the green body after applying the ground glaze, wherein the cover glaze contains 0.2 wt % to 0.7 wt % of coloring metal oxide to make the coloring bright;
roller-printing patterns on the surface of the green body after applying the cover glaze; and drying the green body after roller-printing the pattern and firing in a kiln.

The cover glaze is preferably a high-silicon cover glaze. In some technical solutions, in addition to the coloring metal oxide, the chemical composition of the cover glaze further includes, in percentage by mass: loss on ignition: 6.5% to 7.5%; $SiO_2$: 48% to 53%; $Al_2O_3$: 8% to 10%; $TiO_2$: 7% to 8%; CaO: 10% to 13%; MgO: 2.0% to 3.0%; $K_2O$: 3.0% to 4.0%; and ZnO: 9% to 11%. The content of the coloring metal oxide in the cover glaze is further preferably 0.2 wt % to 0.6 wt %.

Preferably, the specific gravity of the cover glaze is 1.55 $g/cm^3$ to 1.58 $g/cm^3$, and an application amount of the cover glaze is 380 $g/m^2$ to 410 $g/m^2$.

Preferably, the coloring metal oxide is one of, or a mixture of more than one of, copper oxide, cobalt oxide, nickel oxide, and manganese oxide.

Roller printing patterns can be carried out by applying a roller effect glaze on the surface of the green body. In some technical solutions, the chemical composition of the roller effect glaze includes, in percentage by mass: $SiO_2$: 47% to 50%; $Al_2O_3$: 7% to 9%; $TiO_2$: 12% to 13%; CaO: 10% to 13%; MgO: 2.0% to 3.0%; $K_2O$: 2.0% to 3.0%; $Na_2O$: 3.0% to 4.0%; and ZnO: 10% to 12%.

Preferably, a flow velocity of the roller effect glaze is 17 to 20 seconds. Preferably, the specific gravity of the roller effect glaze is 1.28 $g/cm^3$ to 1.32 $g/cm^3$, and an application amount of the roller effect glaze is 40 $g/m^2$ to 50 $g/m^2$.

Preferably, a maximum firing temperature is 1,210° C. to 1,230° C., and the firing duration is 90 to 100 minutes.

Preferably, the metallic liquid luster is sprayed on the surface of the green body at 750° C. to 850° C. in the process of firing to form a metallic liquid luster film. An application amount of the metallic liquid luster can be 50 $g/m^2$ to 60 $g/m^2$. A thickness of the metallic formed liquid luster film can be 5 mm to 6 mm.

Preferably, the chemical composition of the ground glaze includes, in percentage by mass: $SiO_2$: 65% to 67%: $Al_2O_3$: 15% to 17%: MgO: 1.0% to 1.2%: $K_2O$: 1.0% to 1.2%: $Na_2O$: 1.7% to 2.0%: and $ZrO_2$: 8% to 10%, a method of applying the ground glaze is glaze spraying, the specific gravity of the ground glaze is 1.35 $g/cm^3$ to 1.38 $g/cm^3$, and an application amount of the ground glaze is 200 $g/m^2$ to 230 $g/m^2$.

In a second aspect, the present invention provides a ceramic plate with a colorful flowing cloud surface decoration effect, which is obtained by any of the aforementioned preparation methods. Preferably, the specification of the ceramic plate has a length of 1,800 mm to 3,600 mm, a width of 900 mm to 1,600 mm, and a thickness of 5.5 mm to 10.5 mm.

Beneficial Effect

The present invention has the following beneficial effects:

Innovativeness: The preparation method of the present invention adopts a brightly colored cover glaze, and also uses rollers with different pattern textures to print a specially developed roller effect glaze on the surface of the ceramic product to form different texture effects; and finally, the metallic liquid luster is sprayed on the surface of the ceramic tile at a controlled specific temperature of high temperature cooling in the process of firing, thus producing a ceramic plate with a strong colorful flowing cloud effect and three-dimensional effect.

Good decoration effect: Compared with ordinary inkjet-printed ceramic plates, the ceramic plate of the present invention has a particularly vivid colorful surface and has a strong sense of layering. Especially, after spraying the metallic liquid luster, an iridescent metallic effect is produced on the surface of the ceramic plate, which can form a unique iridescent flowing cloud effect under light.

Wide application range: The present invention is not affected by environmental factors, and can be widely applied to various internal and external walls, ground decoration, and large plate background walls.

Easy cleaning: The ceramic plate of the present invention is completely sintered, with water absorption controlled within 0.5 wt %, and belongs to the category of high-glossiness ceramic tiles. The preparation of the ceramic tiles does not require a polishing process, and almost no pores can be seen on the surface of the ceramic tile. Moreover, a thin layer of metallic film is formed after the metallic liquid luster is sprayed. Therefore, the ceramic plate is easy to clean and does not absorb dirt.

High durability: The ceramic plate of the present invention has stable properties, is less affected by time and environmental factors, has high abrasion resistance, can be kept as new for a long time, has a long service life, and has broad market economic benefits.

BRIEF DESCRIPTION OF DRAWING

The FIGURE is a tile surface effect picture of a ceramic plate with a colorful flowing cloud surface decoration effect according to Example 1 of the present invention.

DETAILED DESCRIPTION OF PREFERRED EMBODIMENTS

The present invention will be further illustrated by the following embodiments, and it should be understood that the following embodiments are only used to illustrate the present invention rather than to limit it. Unless otherwise specified, each percentage refers to a percentage by mass.

A preparation method for a ceramic plate with a colorful flowing cloud surface decoration effect according to the present invention will be exemplarily illustrated hereinafter.

A ceramic base material (also referred to as "a powder of green body") is pressed and formed to obtain a green body of the ceramic plate. The chemical composition and material composition of the ceramic base material are not limited, and the ceramic base material commonly used in the art can be adopted. As an example, the chemical composition of the ceramic base material may include, in percentage by mass: loss on ignition (IL): 3.5% to 4.5%; $SiO_2$: 58% to 63%; $Al_2O_3$: 25% to 30%; $Fe_2O_3$: 0.5% to 0.8%; $TiO_2$: 0.3% to 0.6%; CaO: 0.3% to 0.5%; MgO: 1.1% to 1.5%; $K_2O$: 2.0% to 2.5%; and $Na_2O$: 2.3% to 2.7%. In some embodiments, the material composition of the ceramic base material may include, in percentage by mass: albite: 18% to 21%; (golden) medium sand: 15% to 18%; ball clay (place of origin is Shaoguan): 5% to 8%; washed ball clay: 10% to 13%; black talc: 2% to 3%; calcined bauxite: 13% to 18%; potassium-alumina sand: 20% to 25%; bentonite: 2% to 3%; and black mud (place of origin is Zhongshan): 5% to 8%.

The green body is dried. A drying kiln may be used for drying. The drying process depends on specific requirements. For example, the drying time may be 1 to 1.2 hours, and the moisture content of the dried green body is controlled within 0.5 wt %.

A ground glaze is applied on the surface of the dried green body. The main purpose is to cover the base color and defects of the green body. Moreover, it should also ensure that the expansion coefficients of the green body and the ground glaze are matched with each other, that is, the expansion coefficient of the ground glaze is close to that of the green body. A zirconium white ground glaze is preferred.

In some embodiments, the chemical composition of the ground glaze may include, in percentage by mass: $SiO_2$: 65% to 67%; $Al_2O_3$: 15% to 17%; MgO: 1.0% to 1.2%; $K_2O$: 1.0% to 1.2%; $Na_2O$: 1.7% to 2.0%; and $ZrO_2$: 8% to 10%. For example, the chemical composition of the ground glaze may include, in percentage by mass: IL: 2.5% to 4.5%; $SiO_2$: 65% to 67%; $Al_2O_3$: 15% to 17%; $Fe_2O_3$: 0.3% to 0.5%; $TiO_2$: 0.05% to 0.3%; CaO: 0.2% to 0.3%; MgO: 1.0% to 1.2%; $K_2O$: 1.0% to 1.2%; $Na_2O$: 1.7% to 2.0%; and $ZrO_2$: 8% to 10%.

The material composition of the aforementioned ground glaze may include, in percentage by mass: potassium feldspar: 30% to 35%; nepheline: 17% to 20%; quartz: 30% to 35%; calcined talc: 1% to 1.5%; kaolin: 10% to 12%; burnt clay: 3% to 4%; alumina: 1.0% to 2.0%; and zirconium silicate: 8% to 10%.

The method of applying the ground glaze may be glaze spraying. The specific gravity of the ground glaze may be 1.35 $g/cm^3$ to 1.38 $g/cm^3$, and the application amount of the ground glaze may be 200 $g/m^2$ to 230 $g/m^2$.

A cover glaze is applied on the surface of the green body after applying the ground glaze. An appropriate amount of coloring metal oxide is introduced into the cover glaze to produce a vivid color. If the process of applying the ground glaze is omitted and the cover glaze is directly applied on the surface of the green body, even if the same amount of cover glaze is applied, the color will be dull and less vivid.

The content of the coloring metal oxide in the aforementioned cover glaze is preferably 0.2 wt % to 0.7 wt %. The excessive amount of the coloring metal oxide will lead to the darkening of the color of the cover glaze, and as a result, the glaze layer will lose glossiness and become dull, failing to achieve the colorful flowing cloud effect. The aforementioned coloring metal oxide includes but is not limited to copper oxide, cobalt oxide, nickel oxide, manganese oxide, etc. Different types of coloring metal oxides exhibit different colors in this cover glaze system. For example, the color is peak green when copper oxide is used, blue when cobalt oxide is used, or reddish brown when manganese oxide is used.

The chemical composition of the aforementioned cover glaze may include, in percentage by mass: IL: 6.5% to 7.5%; $SiO_2$: 48% to 53%; $Al_2O_3$: 8% to 10%; $TiO_2$: 7% to 8%; CaO: 10% to 13%; MgO: 2.0% to 3.0%; $K_2O$: 3.0% to 4.0%; ZnO 9% to 11%; and coloring metal oxide 0.2% to 0.7%. The aforementioned cover glaze is a high-silicon cover glaze, mainly with a high-silicon and low-aluminum content, and also introduces a large amount of calcium oxide (e.g., by introducing frits), which helps to reduce the viscosity of the cover glaze and increase the fluidity of the cover glaze and the glossiness of the glaze surface. In addition, titanium oxide and zinc oxide are also added into the cover glaze to help stabilize the coloring of the oxide.

In some embodiments, the chemical composition of the cover glaze includes, in percentage by mass: IL: 6.5% to 7.5%; $SiO_2$: 48% to 53%; $Al_2O_3$: 8% to 10%; $Fe_2O_3$: 0.1% to 0.2%; $TiO_2$: 7% to 8%; CaO: 10% to 13%; MgO: 2.0% to 3.0%; $K_2O$: 3.0% to 4.0%; $Na_2O$: 0.2% to 0.3%; CuO: 0.3% to 0.5%; ZnO: 9% to 11%; and CoO: 0.15% to 0.2%.

During an experiment, the aforementioned high-silicon cover glaze was replaced by an ordinary cover glaze (i.e., adding zirconium silicate to assist the coloring of the ordinary pigment), but it was found that a more vivid coloring could not be achieved, the color was dull, and the fluidity of the glaze was poor, affecting overall layering.

In some embodiments, the material composition of the cover glaze may include, in percentage by mass: potassium feldspar: 25% to 30%; quartz: 10% to 15%; calcite: 10% to 15%; calcined zinc oxide: 7% to 10%; black clay (place of origin is Zhongshan): 5% to 8%; titanium oxide: 6% to 8%;

calcined talc: 5% to 8%; frit A: 23% to 28%; frit B: 5% to 8%; and coloring oxide: 0.2% to 0.5%. The chemical composition of frit A includes, in percentage by mass: IL: 0.5% to 1.5%; $SiO_2$: 27% to 30%; $Al_2O_3$: 8% to 10%; $Fe_2O_3$: 0.1% to 0.2%; $TiO_2$: 0.2% to 0.5%; CaO: 25% to 35%; MgO: 0.5% to 1.0%; $K_2O$: 2.0% to 3.0%; $Na_2O$: 0.2% to 0.3%; and ZnO 27% to 30%. The chemical composition of frit B includes, in percentage by mass: IL: 0.5% to 1.5%; $SiO_2$: 48% to 50%; $Al_2O_3$: 9% to 12%; $Fe_2O_3$: 0.1% to 0.2%; $TiO_2$: 1% to 2%; CaO: 23% to 28%; MgO: 1.5% to 2.0%; $K_2O$: 3.0% to 4.0%; $Na_2O$: 2.0% to 3.0%; and ZnO: 8% to 10%.

The initial melting temperature of the aforementioned cover glaze is 950° C. to 1,100° C. By controlling the initial melting temperature of the cover glaze within the aforementioned range, it can be ensured that harmful gas can be thoroughly discharged in the process of firing, and at the same time, the glaze layers are integrated without mutual permeation, resulting in a better flatness of the glaze surface, which is conducive to maintaining the sense of layering of the colorful flowing cloud.

The method of applying the cover glaze may be glaze spraying. The specific gravity of the cover glaze may be 1.55 $g/cm^3$ to 1.58 $g/cm^3$, and the application amount of the cover glaze may be 380 $g/m^2$ to 410 $g/m^2$. By controlling the application amount of the cover glaze within the aforementioned range, both dull coloring as a result of an insufficient amount of cover glaze applied and dark coloring as a result of an excessive amount of cover glaze applied can be avoided. In addition, when the application amount of the cover glaze is too much, the maturing temperature of the cover glaze is relatively high, and as a result, the cover glaze cannot be matured at a fixed firing temperature of the kiln, resulting in defects such as dullness. Moreover, too much oxide in the cover glaze will make the transparency of the glaze layer poor, further affecting the layering of the product.

Patterns are roller-printed on the surface of the green body after applying the cover glaze. Different pattern textures with varying heights are roller-printed, which is combined with the cover glaze with the vivid color to present various pattern effects. The roller-printing may adopt a single roller or a combination of multiple rollers. Because ink does not produce color on the surface of the cover glaze and can be repelled, inkjet printing has a poor sense of layering. In addition, titanium dioxide is used as an opacifying agent in both the cover glaze and the roller effect glaze of the present invention, and ink cannot produce a color in the glaze system, thus a colorful flowing cloud effect cannot be achieved. Therefore, the inkjet printing method is not applicable to the present invention. The pattern printed by screen printing is fixed and monotonous, making it difficult to change the pattern flexibly. The present invention uses a roller with carved patterns to achieve an excellent transition effect of undulating patterns, and the patterns can be randomly combined in the process of continuous production to bring more artistry.

The roller-printed effect is achieved by applying the roller effect glaze (also referred to as "effect glaze" or "roller effect fancy glaze") on the surface of the green body. The chemical composition of the roller effect glaze may include, in percentage by mass: $SiO_2$: 47% to 50%; $Al_2O_3$: 7% to 9%; $TiO_2$: 12% to 13%; CaO: 10% to 13%; MgO: 2.0% to 3.0%; $K_2O$: 2.0% to 3.0%; $Na_2O$: 3.0% to 4.0%; and ZnO: 10% to 12%. The roller effect glaze mainly utilizes the milky white effect of titanium oxide to produce clouds patterns.

The difference between the chemical compositions of the roller effect glaze and the chemical compositions of the cover glaze should not be too great, so that the composition systems of the roller effect glaze and the cover glaze can be so similar as to be better integrated without repulsion, and thereby, the cover glaze and the roller effect glaze can cooperate with each other to achieve a clearly layered cloud effect. Preferably, the initial melting temperature of the cover glaze is 5° C. to 10° C. higher than that of the roller effect glaze. The purpose is to make a better permeative transition between the contacted edges of the roller effect glaze and the cover glaze. When the initial melting temperature of the chosen cover glaze is lower than that of the effect glaze, the cover glaze partially covers the effect glaze, so that the roller effect glaze sinks into the cover glaze, failing to achieve the objective of the present invention. In addition, it should be noted that if the coloring metal oxide is added to the roller effect glaze, when multiple rollers are used in combination, the addition of the oxide in the glaze will lead to a poor transition between the edges of the cover glaze and the roller effect glaze, resulting in a poor iridescent flowing cloud effect. According to the present invention, the cloud effect patterns printed on the surface of the cover glaze by roller-printing clearly contrast with the color of the cover glaze, producing a better visually distinct effect.

In some embodiments, the chemical composition of the roller effect glaze includes, in percentage by mass: IL: 5.5% to 7.0%; $SiO_2$: 47% to 50%; $Al_2O_3$: 7% to 9%; $Fe_2O_3$: 0.1% to 0.2%; $TiO_2$: 12% to 13%; CaO: 10% to 13%; MgO: 2.0% to 3.0%; $K_2O$: 2.0% to 3.0%; $Na_2O$: 3.0% to 4.0%; and ZnO: 10% to 12%.

The material composition of the aforementioned roller effect glaze may include, in percentage by mass: potassium feldspar: 10% to 15%; albite: 15% to 20%; quartz: 12% to 15%; calcite: 10% to 12%; calcined zinc oxide: 10% to 13%; black clay (the place of origin is Zhongshan): 5% to 8%; titanium oxide: 12% to 15%; calcined talc: 5% to 6%; frit A: 15% to 20%; and frit B: 3% to 5%. The chemical composition of frit A may include, in percentage by mass: IL: 0.5% to 1.5%; $SiO_2$: 27% to 30%; $Al_2O_3$: 8% to 10%; $Fe_2O_3$: 0.1% to 0.2%; $TiO_2$: 0.2% to 0.5%; CaO: 25% to 28%; MgO: 0.5% to 1.0%; $K_2O$: 2.0% to 3.0%; $Na_2O$: 0.2% to 0.3%; and ZnO 27% to 30%. The chemical composition of frit B may include, in percentage by mass: IL: 0.5% to 1.5%; $SiO_2$: 48% to 50%; $Al_2O_3$: 9% to 12%; $Fe_2O_3$: 0.1% to 0.2%; $TiO_2$: 1% to 2%; CaO: 23% to 25%; MgO: 1.5% to 2.0%; $K_2O$: 3.0% to 4.0%; $Na_2O$: 2.0% to 3.0%; and ZnO: 8% to 10%.

It was found in the experiment that when a large amount of calcined zinc oxide and titanium oxide were introduced into the raw material composition of the aforementioned roller effect glaze, this led to a poor fluidity of the roller effect glaze. Therefore, the present invention regulates the composition of the glaze slurry of the roller effect glaze, so as to significantly increase the properties of the roller effect glaze, so that the roller carving patterns can be perfectly printed on the surface of the green body to form colorful flowing clouds. In some embodiments, the glaze slurry of the roller effect glaze includes: in parts by mass, 100 parts by weight of roller effect glaze, 100 to 150 parts by weight of print oil, 10 to 30 parts by weight of dispergator, 0.1 to 0.5 parts by weight of sodium carboxymethyl cellulose, 0.1 to 0.5 parts by weight of sodium tripolyphosphate, and 1 to 10 parts by weight of water. At this point, the roller effect patterns have good fluidity, high clarity, and good three-dimensional effect, and do not stick to the roller, allowing for continuous production. In some embodiments, the flow velocity of the roller effect glaze is 17 to 20 seconds. In some embodiments, the specific gravity is 1.28 g/cm³ to 1.32 g/cm³, and the application amount of the roller effect glaze is 40 g/m² to 50 g/m². If the roller effect glaze is low in flow velocity and specific gravity and is applied in the same amount, the cloud effect will be blurred. On the contrary, if the specific gravity and flow velocity of roller effect glaze are high, the poor transition of the roller effect glaze during high-temperature melting will lead to clear boundaries, failing to form the colorful flowing cloud effect. Moreover, the excessive application amount of the roller effect glaze may even lead to a dull glaze surface.

In the process of high-temperature melting, the cover glaze and roller effect glaze with the chemical compositions according to the present invention can form a high-glossiness glaze layer, which has a high vitrification degree and no defects, such as pinholes, on the surface. Therefore, the preparation method of the present invention does not need to apply a transparent frit layer on the surface of the ceramic green body forming the colorful flowing cloud patterns.

Different from using a high-refractive index transparent glaze to generate iridescent pearly luster, the present invention uses the cover glaze with vivid color, utilizes the rollers to print different patterns to form the flowing cloud effect, and finally sprays the metallic liquid luster and bakes it on the surface of the glaze layer under high temperature, thereby producing a pearl-like colorful flowing cloud surface decoration effect under the irradiation of light. In order to form the colorful flowing cloud effect, the main technical difficulties are: firstly, the glaze layer is required to meet the high-silicon, low-aluminum system, so that the coloring liquid luster can be better attached to the surface of the glaze layer; and secondly, the formula systems of the cover glaze and the roller effect glaze is required to be similar, so that the effect glaze and the cover glaze can be integrated without mutual repulsion, so as to achieve a clearly layered cloud effect.

The green body with the roller-printed patterns is dried and fired in a kiln.

In this firing system, the maximum firing temperature is 1,210° C. to 1,230° C., and the firing duration is 90 to 100 minutes. Preferably, in the firing process, the metallic liquid luster is sprayed on the surface of the green body at 750° C. to 850° C. By painting the metallic liquid luster on the glaze surface, metallic or pearly luster can be presented when the metallic liquid luster is baked at 750° C. to 800° C. The liquid luster is available in the market. For example, an organic liquid pigment which is prepared by mixing bismuth and various metal salts into a resin to prepare a metallic soap and then dissolving it into an oil mixture can be used. The metallic liquid luster (product model: 25A) used in the embodiments is purchased from Foshan Sencailiang Decoration Material Co., Ltd.

The application amount of the metallic liquid luster may be 50 g/m² to 60 g/m². At this point, the metallic liquid luster has a vivid color effect and a good visual effect, meeting the production requirement.

In some embodiments, a swing arm automatic spray gun is mounted at the top of the kiln, and during the high temperature cooling stage of firing, e.g., when cooled to 750° C. to 850° C., the metallic liquid luster is sprayed on the surface of the ceramic plate by the swing-arm automatic spray gun. The thickness of the metallic liquid luster film is controlled by adjusting the moving speed of the spray gun and the application amount of the metallic liquid luster. The moving speed of the spray gun may be 55 m/min to 65 m/min. The thickness of the metallic liquid luster film may be 5 mm to 6 mm.

Finally, edging, grading, and packaging are carried out. The ceramic product described in the present invention has a bright mirror effect, with a flat glaze surface without pinholes, and moreover, the liquid luster forms a film on the surface of the green body and is attached to the surface of the ceramic plate to combine with the flowing cloud effect formed by the roller effect glaze, ultimately producing a ceramic plate with a colorful flowing cloud effect. The aforementioned series of products do not require polishing, thus avoiding the energy consumption caused by polishing in the process of production.

Examples will be given to further illustrate the present invention in detail below. It should also be understood that the following examples are only used to further illustrate the present invention rather than to limit the protection scope of the present invention. All non-essential improvements and adjustments which are made by those skilled in the art according to the above contents of the present invention shall fall within the protection scope of the present invention. The specific technological parameters of the following examples are merely one example in an appropriate range, that is, those skilled in the art can make choices within the appropriate range through the description herein, but the choices are not limited to the specific values of the following examples.

Example 1

A preparation method for a ceramic plate with a colorful flowing cloud surface decoration effect includes the following steps:

(Step 1) A ceramic base material was pressed and formed to obtain a green body, and the green body was dried in a drying kiln.

(Step 2) A ground glaze was sprayed on the surface of the dried green body, with a specific gravity of the ground glaze being 1.35 g/cm³ and an application amount of the ground glaze being 200 to 230 g/m².

(Step 3) A cover glaze was sprayed on the surface of the green body after applying the ground glaze, with a specific gravity of the cover glaze being 1.56 g/cm³ and an application amount of the cover glaze being 380 g/m² to 410 g/m².

(Step 4) Roller-printing a pattern was carried out on the surface of the green body after applying the cover glaze. Different patterns were presented by utilizing different roller engraved textures and printing the roller effect glaze. The specific gravity of the roller effect glaze was 1.28 g/cm³ to 1.32 g/cm³.

(Step 5) The green body was fired in a kiln after roller-printing the pattern. During the firing process of the kiln, when the temperature of the kiln cooled to 750° C. to 800° C., a swing arm automatic spray gun was mounted onto the top of the kiln. The thickness of the metallic liquid luster film was controlled by adjusting the movement speed of the automatic spray gun and the spraying amount of metallic liquid luster. The spraying amount of the metallic liquid luster was 50 g/m² to 60 g/m².

(Step 6) The fired green body was edged and packaged.

Comparative Example 1

Comparative example 1 is substantially the same as Example 1, except that the chemical composition of the cover glaze includes, in percentage by mass: IL: 2.5% to 4.5%; $SiO_2$: 60% to 63%; $Al_2O_3$: 12% to 15%; $Fe_2O_3$: 0.3% to 0.5%; $TiO_2$: 0.05% to 0.3%; CaO: 7.5% to 10.5%; MgO: 2.0% to 4.5%; $K_2O$: 1.0% to 2.0%; $Na_2O$: 0.5% to 1.0%; and $ZrO_2$: 8% to 10%. The material composition of the cover glaze includes, in percentage by mass: frit C: 15% to 18%; potassium feldspar: 35% to 38%; calcite: 12% to 16%; talc: 8% to 10%; kaolin: 8% to 10%; black mud (place of origin is Zhongshan): 3% to 5%; zinc oxide: 3% to 5%; nepheline: 8% to 10%; zirconium silicate: 8% to 10%; and barium carbonate: 3% to 5%. Wherein, the chemical composition of frit C includes, in percentage by mass: IL: 0.3% to 0.5%; $SiO_2$: 55% to 58%; $Al_2O_3$: 13% to 15%; $Fe_2O_3$: 0.1% to 0.2%; $TiO_2$: 0.02% to 0.05%; CaO: 10% to 12%; MgO: 2.0% to 2.5%; $K_2O$: 5.0% to 6.5%; $Na_2O$: 0.3% to 0.6%; and ZnO: 3% to 5%. During the use of the cover glaze mentioned above, 1% to 10% of ordinary pigment was added into the cover glaze to assist in coloring. The pigment specifically could be gold brown (trademark 816), vanadium-zirconium blue, or cobalt blue.

However, the ceramic plate obtained in Comparative example 1 did not have a vivid color and had poor fluidity (of cover glaze), making it unable to achieve a distinct sense of layering.

Comparative Example 2

Comparative example 2 is substantially the same as Example 1, except that the chemical composition of the roller effect glaze includes, in percentage by mass: IL: 0.3% to 0.5%; $SiO_2$: 56% to 59%; $Al_2O_3$: 12% to 15%; $Fe_2O_3$: 0.1% to 0.2%; $TiO_2$: 0.02% to 0.05%; CaO: 8% to 10%; MgO: 2.0% to 2.5%; $K_2O$: 3.0% to 3.5%; $Na_2O$: 0.3% to 0.6%; ZnO: 3% to 5%; and $ZrO_2$: 5% to 8%. The roller effect glaze of Comparative example 2 had good flowability, but poor coloring. Moreover, the roller effect glaze was prone to pinholes and had poor levels. In addition, ordinary pigments with weaker color development tended to have a yellowish and darker color development in bright glaze (the roller effect glaze) with high content of calcium and magnesium. At the same time, due to the low initial melting point of the roller effect glaze and the great difference in compositions between the roller effect glaze and the cover glaze, the different components reacted to merge together, leading to a deviation in the layering effect of the obtained ceramic plate and the occurrence of dry glaze, pinholes and other phenomena in local areas.

Comparative Example 3

Comparative example 3 is substantially the same as Example 1, except that the chemical composition of the cover glaze includes, in percentage by mass: IL: 0.5% to 1.5%; $SiO_2$: 52% to 55%; $Al_2O_3$: 5% to 8%; $Fe_2O_3$: 0.1% to 0.2%; $TiO_2$: 1% to 2%; CaO: 23% to 28%; MgO: 1.5% to 2.0%; $K_2O$: 3.0% to 4.0%; $Na_2O$: 2.0% to 3.0%; and ZnO: 8% to 10%. The chemical composition of the roller effect glaze includes, in percentage by mass: IL: 0.5% to 1.5%; $SiO_2$: 48% to 50%; $Al_2O_3$: 9% to 12%; $Fe_2O_3$: 0.1% to 0.2%; $TiO_2$: 1% to 2%; CaO: 23% to 25%; MgO: 1.5% to 2.0%; $K_2O$: 3.0% to 4.0%; $Na_2O$: 2.0% to 3.0%; and ZnO: 8% to 10%. Due to the lowering of the initial melting temperature of the cover glaze and the reduction of alumina content, the resulting cover glaze had a good color development and obvious crystal flowers, but the cover glaze could be easily stuck on the edge of the green body. Moreover, there was more blend between the roller effect glaze and cover glaze, resulting in a blurry flowing cloud effect on the tile surface, as well as pinholes, blisters and dry glaze phenomena in local areas. This is mainly due to the decrease in the initial melting point of the cover glaze, causing a mismatch between the cover glaze and the roller effect glaze.

Comparative Example 4

Comparative example 4 is substantially the same as Example 1, except that the chemical composition of the cover glaze includes, in percentage by mass: IL: 1.5% to 4.5%; $SiO_2$: 58% to 65%; $Al_2O_3$: 13% to 20%; $Fe_2O_3$: 0.1% to 0.3%; $TiO_2$: 0.01% to 0.02%; CaO: 10% to 15%; MgO: 2.5% to 4.0%; $K_2O$: 2.0% to 4.0%; $Na_2O$: 1.0% to 3.0%; ZnO: 3% to 4%; BaO: 3.0% to 5.0%; and $P_2O_5$: 0.2% to 0.3%. The chemical composition of the roller effect glaze includes, in percentage by mass: IL: 0.5% to 1.5%; $SiO_2$: 48% to 50%; $Al_2O_3$: 9% to 12%; $Fe_2O_3$: 0.1% to 0.2%; $TiO_2$: 1% to 2%; CaO: 23% to 25%; MgO: 1.5% to 2.0%; $K_2O$: 3.0% to 4.0%; $Na_2O$: 2.0% to 3.0%; and ZnO: 8% to 10%. There is a significant difference between the cover glaze system and the roller effect glaze in Comparative example 4, especially the oxide added in the cover glaze could not show color or the color was not obvious (bright) in this experiment, failing to meet the requirement. Moreover, the roller effect glaze sank into the cover glaze, resulting in a phenomenon of dry glaze and blistering in local areas.

What is claimed is:

1. A preparation method for a ceramic plate with a colorful flowing cloud surface decoration effect, comprising: pressing and forming a ceramic base material to obtain a green body of the ceramic plate; applying a ground glaze on a surface of the green body to cover the base color and defects of the green body; applying a cover glaze on the surface of the green body after applying the ground glaze, wherein the cover glaze contains 0.2 wt % to 0.7 wt % of a coloring metal oxide to make the coloring bright, in addition to the coloring metal oxide, the chemical composition of the cover glaze further includes, in percentage by mass: loss on ignition: 6.5% to 7.5%; $SiO_2$: 48% to 53%; $Al_2O_3$: 8% to 10%; $TiO_2$: 7% to 8%; CaO: 10% to 13%; MgO: 2.0% to 3.0%; $K_2O$: 3.0% to 4.0%; and ZnO: 9% to 11%, the specific gravity of the cover glaze is 1.55 g/cm$^3$ to 1.58 g/cm$^3$, and an application amount of the cover glaze is 380 g/m$^2$ to 410 g/m$^2$; applying a roller effect glaze on the surface of the green body after applying the cover glaze for roller-printing, so as to print cloud effect patterns on the surface of the cover glaze, wherein the chemical composition of the roller effect glaze includes, in percentage by mass: $SiO_2$: 47% to 50%; $Al_2O_3$: 7% to 9%; $TiO_2$: 12% to 13%; CaO: 10% to 13%; MgO: 2.0% to 3.0%; $K_2O$: 2.0% to 3.0%; $Na_2O$: 3.0% to 4.0%; and ZnO: 10% to 12%, the specific gravity of the roller effect glaze is 1.28 g/cm$^3$ to 1.32 g/cm$^3$, an application amount of the roller effect glaze is 40 g/m$^2$ to 50 g/m$^2$, and an initial melting temperature of the cover glaze is 5° C. to 10° C. higher than that of the roller effect glaze to ensure that contact edges of the roller effect glaze and the cover glaze have a transitional permeability effect with undulating patterns; and drying the green body after roller-printing and firing in a kiln, wherein a metallic liquid luster is sprayed on the surface of the green body at 750° C. to 850° C. in the process of firing to form a metallic liquid luster film, an application amount of the metallic liquid luster is 50 g/m$^2$ to 60 g/m$^2$, and a thickness of the formed metallic liquid luster film is 5 mm to 6 mm.

2. The preparation method according to claim 1, wherein the coloring metal oxide is one of, or a mixture of more than one of, copper oxide, cobalt oxide, nickel oxide, and manganese oxide.

3. The preparation method according to claim 1, wherein a maximum firing temperature is 1210° C. to 1230° C., and a firing duration is 90 to 100 minutes.

4. The preparation method according to claim 1, wherein the chemical composition of the ground glaze includes, in percentage by mass: $SiO_2$: 65% to 67%; $Al_2O_3$: 15% to 17%; MgO: 1.0% to 1.2%; $K_2O$: 1.0% to 1.2%; $Na_2O$: 1.7% to 2.0%; and $ZrO_2$: 8% to 10%, a method of applying the ground glaze is glaze spraying, the specific gravity of the ground glaze is 1.35 to 1.38 $g/cm^3$, and an application amount of the ground glaze is 200 $g/m^2$ to 230 $g/m^2$.

* * * * *